May 9, 1950 T. F. ESERKALN 2,507,437
COOLANT RETURN SYSTEM
Filed Dec. 15, 1948 2 Sheets-Sheet 1

Inventor
Theodore F. Eserkaln
ATTORNEY

May 9, 1950 — T. F. ESERKALN — 2,507,437
COOLANT RETURN SYSTEM
Filed Dec. 15, 1948 — 2 Sheets-Sheet 2
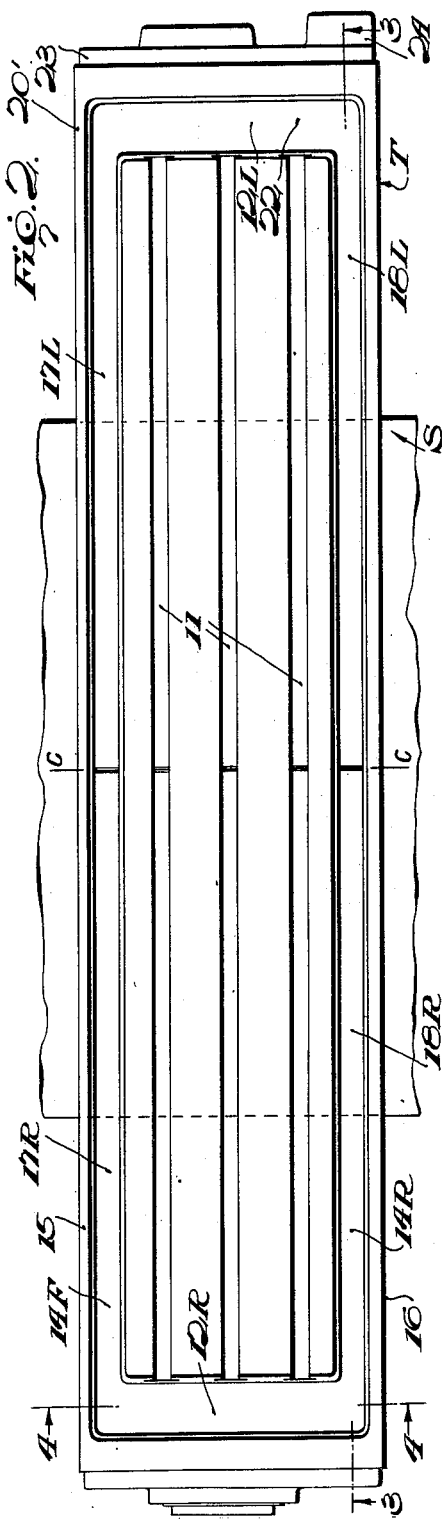
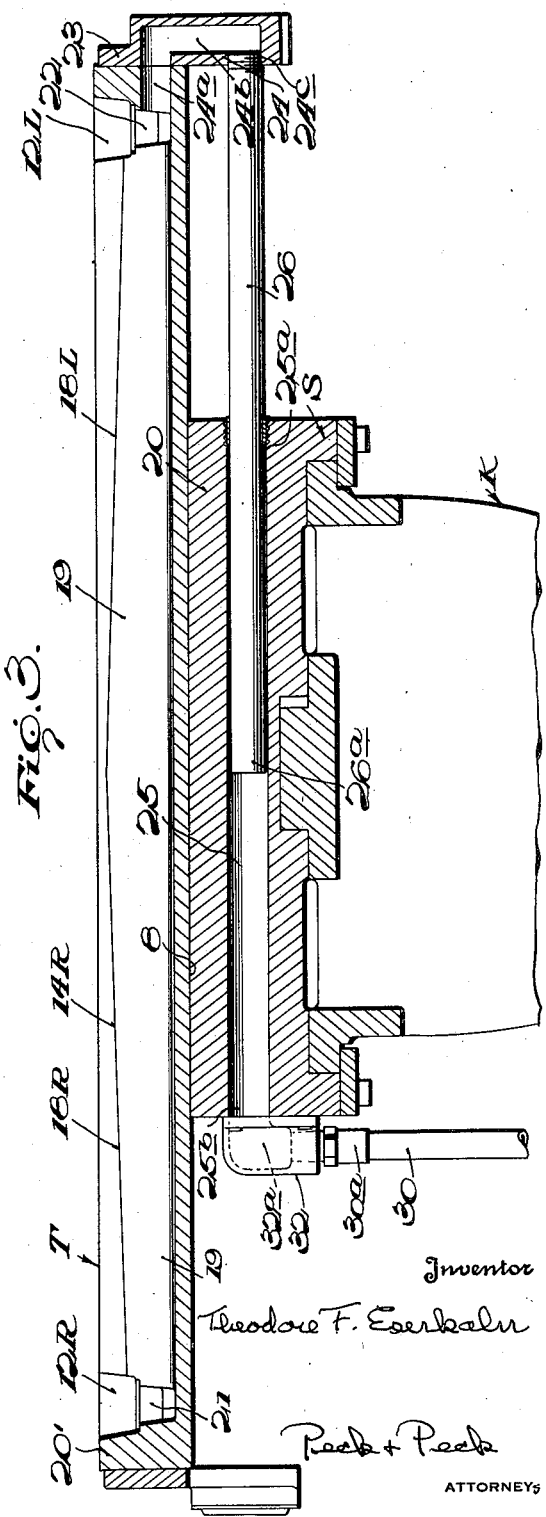
Inventor
Theodore F. Eserkaln
Reeb + Reeb
ATTORNEYS Patented May 9, 1950

2,507,437

UNITED STATES PATENT OFFICE 2,507,437

COOLANT RETURN SYSTEM

Theodore F. Eserkaln, Wauwatosa, Wis., assignor to George Gorton Machine Co., Racine, Wis., a corporation of Wisconsin Application December 15, 1948, Serial No. 65,386

13 Claims. (Cl. 90—11)

This invention concerns coolant return systems particularly adapted to machine tools of the types utilizing a knee, saddle and work table mounted for relative movements therebetween; and the nature and objects of the invention will be readily recognized and understood by those skilled in the art in the light of the following explanation and detailed description of the accompanying drawings illustrating what I now believe to be the preferred embodiment or mechanical expression of my invention and of the various features thereof, from among numerous other forms, expressions, embodiments, designs, constructions, combinations and modifications, of which the invention is capable within the broad spirit and scope thereof as defined by the claims hereto appended.

In certain machining or metal cutting operations it is found desirable to continuously discharge a coolant or other functional liquid on the work and/or cutting tool during the machining or cutting operations. Usually the work is supported upon a suitable movable work table and the coolant is collected on and drained from the table for return to the coolant supply system for recirculation. In certain types of machine tools, such for example as a milling or the like machine, the work is mounted on a work table which is supported on a saddle and knee, with the table, saddle and knee being relatively movable for vertical and universal lateral movements of the table. With such types of machine tools, the drainage or the return flow of a liquid coolant from the table to a reservoir or collection point of the coolant supply system remote from the table, presents certain mechanical, structural and functional difficulties due to the relative movements between the knee, saddle and work table and to the requirement that the return flow must be effected continuously without interruption and/or leakage during all operative movements of the work table and in all positions thereof.

It is a primary object of my invention to provide a coolant return flow system from such a knee and saddle mounted work table to a reservoir in the base or frame structure of the machine, which system will be of extreme mechanical simplicity, capable of controlling and effecting with a minimum of leakage the return flow of a coolant from the table to the reservoir without interference with the efficient operation of the relatively movable knee, saddle and work table in carrying out their intended functions, and further which system will be so arranged that there will be a minimum of projecting structure or parts to offer obstruction at the exterior of the machine.

Another and important object is to provide a design and arrangement of coolant return flow system for a knee, saddle and work table assembly in which the coolant return flow path passes and is carried through the saddle in such a manner as to leave the work table bearing or slide surfaces of the saddle unbroken and uninterrupted thereby to thus obtain for such surfaces the maximum of area for insuring stability for the saddle mounted table with a minimum of bearing surface wear.

Another object is to provide such a coolant return flow system in which the coolant is caused to drain from the table to one end thereof for discharge from that end into the table mounting saddle or slide member at the adjacent end of the latter and then is discharged from the saddle at the opposite end thereof into a return flow line to the coolant supply reservoir in the frame structure of the machine.

And a further object is to provide a flow line from the end of the table to the adjacent end of the table-supporting saddle which permits of longitudinal feeding movements of the table on the saddle, and another coolant flow line from the saddle to the reservoir on the machine frame structure which permits of cross feeding movements of the saddle on the knee and vertical movements of the knee, saddle and table assembly.

Another object is to provide a mechanically simple construction and arrangement of the coolant flow line from the work table discharge to the saddle which is characterized by a discharge pipe carried by and movable with the table and extended into a flow passage on the saddle in telescopic relation therewith for relative movements between the table and saddle.

Another object is to provide a mechanically simple and compact coolant flow line from the saddle to a reservoir, characterized by an arrangement of swivelly connected pipe sections which will permit of free and unimpeded vertical movements and cross feeding movements, respectively, of the saddle, while occupying a minimum of space in collapsed position, yet satisfying the extended length requirements for the flow line in its expanded positions.

And a further object is to provide such a saddle or slide member-to-reservoir flow line constituted by the combination of a rigid pipe section and a flexible pipe section swivelly connected together in such a relationship that the flexible section provides the necessary length for the expanded positions of the line but will flex or bend into a length reducing bight in collapsed positions of the line to thus maintain the line within the desired minimum space requirements for the collapsed position thereof.

A further object is to provide a system of coolant drainage or flow passages in a work table which are so arranged as to collect and cause drainage of coolant from all the surfaces of the table and flow therethrough by gravity to a single drainage discharge point located at one end of the table.

With the foregoing objects, features and results, as well as certain others in view, which others will be readily apparent from the following detailed description and explanation, my invention consists in certain novel features and design and in construction and parts and elements and in various associations, combinations and subcombinations thereof, all as will be more fully referred to and described hereinafter.

Referring to the accompanying drawings in which similar reference characters refer to corresponding parts and elements throughout the several figures thereof:

Fig. 2 is a view in top plan of the work table of the knee, saddle and table assembly of Fig. 1.

Fig. 3 is a vertical longitudinal section through the work table taken as on the line 3—3 of Fig. 2.

Figure 1:
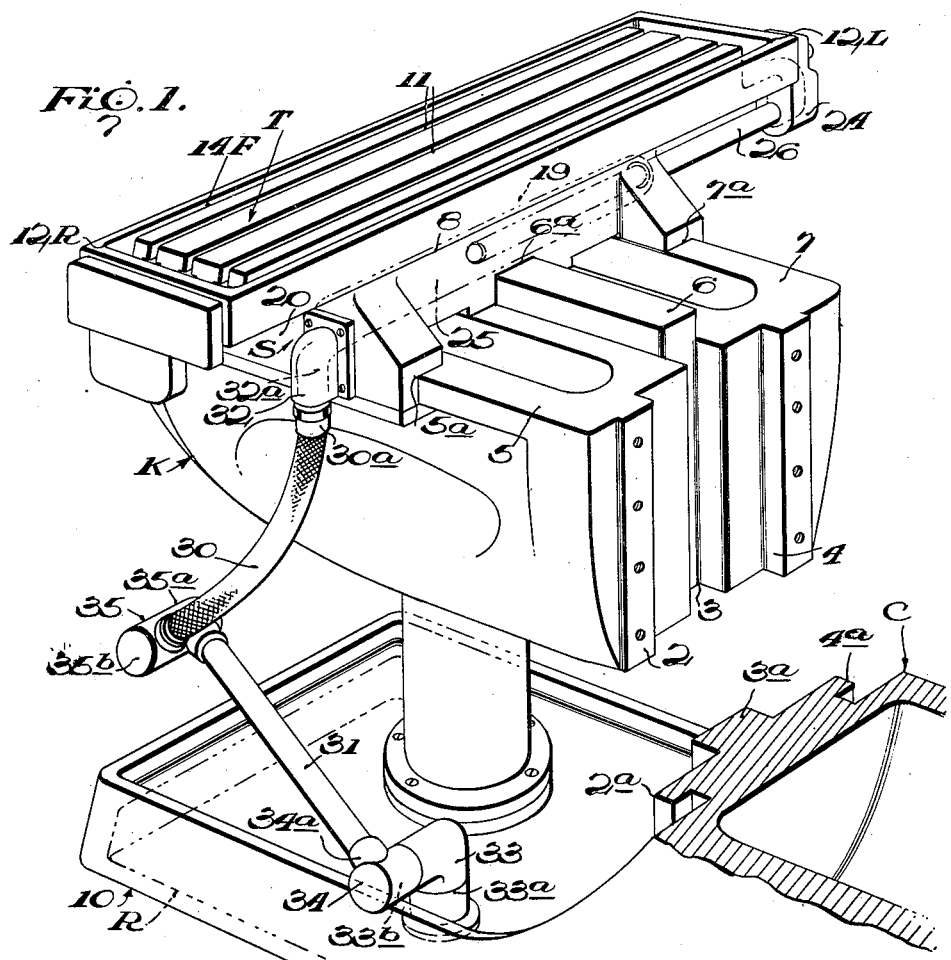
Fig. 1 is a perspective view taken as from the right rear of a knee, saddle and table assembly of a column type milling machine in which a coolant return flow system of my invention is embodied for conducting coolant from the work table to a reservoir in the base of the machine, the major portion of the machine column above the base having been broken away and removed.

In Fig. 1 of the accompanying drawings I have disclosed a form and arrangement of a coolant return flow system of my invention as applied to the knee, saddle and work table assembly of a machine tool of the general milling machine type. In the illustrated example, the base 10 of the machine is shown as extended forwardly from a vertically disposed machine frame or column C. Column C is illustrated in Fig. 1 as broken away, but it may be taken to be the usual vertically disposed column of the art which mounts or supports at its upper end a suitable cutter spindle of the vertical or of the horizontal type for driving a cutting tool. On the base 10 forwardly of column C there is mounted a knee K for vertical straight line movements upwardly and downwardly relative to the base and column C in the usual manner familiar in the art. Knee K at its rear vertical side is provided with a system of vertical slide ways 2, 3 and 4 which are adapted to have slidable bearing engagement with complementary vertical slide ways 2a, 3a and 4a, respectively, provided at the forward vertical side of column structure C. Knee K is vertically movable upwardly and downwardly by any of the well known mechanisms of the art suitable for this purpose.

At its upper, horizontal side, knee K is provided with suitable spaced, longitudinally disposed slideways 5, 6 and 7, and the saddle S is slidably mounted on the knee by slideways 5a, 6a and 7a, disposed transversely of and across the under side thereof and being complementary to and slidably received on and in the knee slideways 5, 6 and 7, respectively. The saddle S is thus mounted on the upper side of knee K and is constrained by the engaged knee and saddle slideways to straight line movements in either direction on the knee toward and from column C, that is, "in and out" relative to the machine for so-called "cross" feeding by any suitable mechanism (not shown).

The saddle S is formed in this example as a generally rectangular body or casting 20 which provides at its upper side suitable slideways disposed longitudinally thereof and perpendicular to the slideways 5a, 6a and 7a and to the straight line path of movement of cross feed of the saddle S on the knee K. The slideways at the upper side of saddle S provide a system of bearing surfaces, including a bearing surface 8 which extends longitudinally from end to end of the saddle S along and adjacent the inner, vertically disposed side wall of the saddle, as will be clear by reference to Fig. 1. Due to the design and arrangement of the coolant return flow system of my invention, this bearing surface 8 may be provided as a continuous unbroken surface to present a bearing surface of substantial area, as will be hereinafter described and explained. Saddle S is movable inwardly or outwardly on knee K for cross feeding by any suitable mechanism (not shown), such as any of the mechanisms for this purpose known to the art.

The work table T is slidably mounted and supported on saddle S by the hereinabove referred to slideways at the upper side of the saddle for longitudinal or "left" and "right" feeding movements in either direction along a straight line path perpendicular to the straight line path of cross feed of saddle S on the knee K. The work table T is provided with slide bearing surfaces at the under side thereof which include a continuous unbroken surface along and adjacent the rear vertical side wall of the table which finds bearing support on the continuous unbroken bearing surface 8 of the system of bearing surfaces at the upper side of saddle S. Table T is provided with the usual or any suitable flange or slide members 9, indicated somewhat schematically in Fig. 4, for slidable engagement in the slideways provided at the upper side of saddle S for constraining the work table precisely to its path of straight line, longitudinal feeding movements on and relative to the saddle, as will be readily understood by those familiar with this art. Table T is bodily movable with the saddle for cross feeding and is movable on and independently of saddle S for longitudinal feeding, any suitable mechanism (not shown) being provided for actuating the table for longitudinal feeding movements.

Figure 4:
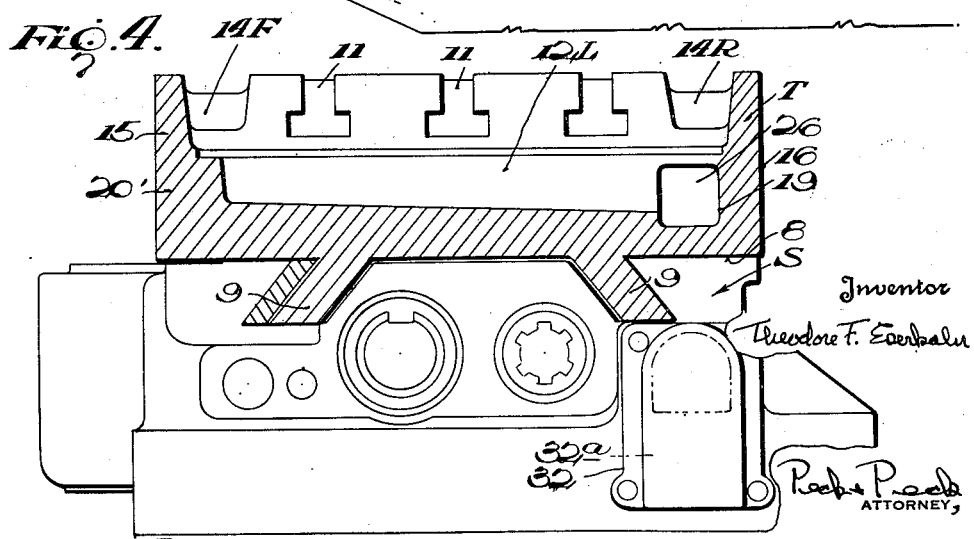
Fig. 4 is a vertical transverse cross section through the work table taken as on the line 4—4 of Fig. 2.

Referring to Figs. 2, 3 and 4, the work table T in the example hereof takes the form of a relatively elongated rectangular body or casing 20′ having the usual longitudinally disposed and spaced T slots 11 formed therein and opening through the surface thereof by which a work piece or work-holding fixture may be attached and secured in desired position on and to the table. Open top wells or sumps 12R and 12L are provided in the table T adjacent the opposite ends thereof, respectively, with the wells each disposed transversely of and across the table. The T slots 11 open at their opposite ends into the wells 12R and 12L, respectively, for drainage of coolant from the slots into the wells. Open top drainage channels 14F and 14R are formed in the table T disposed longitudinally thereof along and adjacent the front and rear vertical side walls 15 and 16, respectively, of the table. The drainage channel 14F opens at its opposite ends into the forward ends of the wells 12R and 12L while the drainage channel 14R opens at its opposite ends into the rear ends of such wells.

The section 17R of the bottom wall of front end drainage channel 14F is sloped or inclined downwardly and outwardly from a location in the vertical plane passing through the line c—c of the table to and discharges into the well 12R, while the opposite length or section 17L of the bottom wall is sloped or inclined outwardly and downwardly from the plane of the central line c—c to and discharges into well 12L. The length or section 18R of the bottom wall of rear drainage channel 14R is sloped or inclined downwardly and outwardly from the plane passing through the central line c—c to and discharges into the rear end of well 12R, while the opposite length or section 18L of this bottom wall is sloped or inclined outwardly and downwardly to and discharges into the rear end of the well 12L. A longitudinally disposed cored opening forming a passage 19 is formed in the body or casting of the table T in communication at its right hand end with the rear end of well 12R and extends through the table to and discharges into the rear end of the well 12L. This passage 19 is sloped or inclined downwardly from well 12R to well 12L so that coolant collected in the well 12R will drain therefrom and flow through the passage to the opposite end of the table where the passage opens into the rear discharge from well 12L. The bottom wall 21 of well 12R is sloped or inclined downwardly and rearwardly to cause the flow of the coolant from the well to the intake end of the passage provided by the cored opening 19. The bottom wall 22 of well 12L is also inclined rearwardly and downwardly to a level for gravity flow of coolant therefrom at the inner or rear end thereof. Thus, coolant drains from the central portion of the table in opposite directions through the drainage channels 15 and 16 to the wells 12R and 12L at the opposite ends of the table with the coolant collected in well 12R draining therefrom into passage 19 which is pitched downwardly to the opposite end of the table for gravity flow of coolant therethrough to join with the coolant flowing by gravity from the rear end of the well 12L.

In the example hereof, an end plate 23 is attached in vertically disposed position on and across the left hand end of table T and provides a depending elbow forming bracket member 24, in this instance integral with plate 23. This depending member 24 is formed with a cored opening therein and therethrough which is in communication at its upper end 24a with the discharge end of well 12L and passage 19. The member 24 depends downwardly a distance below the lower or under side of table T with the cored opening extending from its upper intake end 24a as a downwardly and inwardly curved passage 24b terminating in a horizontally disposed section 24c having its axis parallel with the straight line path of longitudinal feed of the work table T. The body or casting 20 of the saddle S is formed with a cored opening 25 extending longitudinally therethrough adjacent the rear vertical side wall of the saddle in position axially aligned with the horizontally disposed section 24c of the passage through the depending member 24 at the left hand end of the table. This passage 25 extends completely through the saddle and opens at its opposite ends through the adjacent side walls, respectively, of the saddle.

A coolant discharge tube 26 forming a portion of the coolant return flow line from table T, is mounted and secured at its outer end in the horizontal section 24c and the passage through member 24. Tube 26 is mounted in fixed position in member 24 with its axis parallel with the path of longitudinal feeding movements of the table T and is movable as a unit with the table as the table is longitudinally fed in either direction across and relative to the saddle S. This tube 26 extends from member 24 a distance into and through the passage 25 in saddle S into telescoping relation with the saddle. Tube 26 has an external diameter less than the internal diameter of the passage 25 for free movements longitudinally or axially of the tube in and through the passage and relative to the saddle. If desired, any suitable packing gland may be provided in the discharge tube receiving end 25a of passage 25 in the usual slidable sealing engagement with the tube to prevent leakage from the passage around the tube. The inner end 26a of tube 26 which is located at all times within passage 25, is open for discharge of coolant therethrough from the tube into the passage. The passage 25 through the saddle S is preferably inclined or sloped at a sufficient angle downwardly from left to right to insure free gravity flow of coolant through the passage to the right hand discharge end 25b thereof in the right hand side wall of the saddle.

The coolant from work table T delivered by tube 26 into the return flow passage 25 through saddle S, is returned from this passage 25 to the coolant reservoir R in the base 10 of the machine, by a return flow line which connects the passage discharge end 25b in the right hand side wall of saddle S, with the reservoir R. The return flow line from saddle passage discharge opening 25b to the reservoir R is so designed and arranged as to permit of free, unimpeded cross feeding in either direction of saddle S on the knee K, and free, unimpeded vertical feeding upwardly or downwardly of the knee K with the saddle S and table T mounted and supported thereon. Thus, the return flow line system from the table T to the reservoir R permits of longitudinal feeding movements in either direction of work table T on and relative to saddle S; of cross feeding movements in either direction of saddle S as a unit with table T on and relative to knee K; and of vertical movements of knee K, saddle S and table T, without interruption to and while maintaining closed such flow line system from the table T to the reservoir.

For instance, as in the example hereof, the return flow line from saddle passage discharge opening 25b to the reservoir R may be constituted by an arrangement of pivotally or swivelly connected, relatively short length, pipe or tube sections 30 and 31. Pipe or tube section 30 is constituted by a section of any suitable type of flexible hose or tubing and it is connected in leak-proof communication with an elbow forming discharge fitting 32, in position extended forwardly and downwardly from such fitting. Fitting 32 may be formed or cast integral with saddle S, or as in the form here shown, may be a separate unit suitably secured in position to the outer side of the saddle side wall. Fitting 32 is hollow to provide a vertically disposed flow passage 32a therethrough into the upper end of which the discharge end 25b of the saddle return flow passage 25 opens and discharges. Flexible pipe or tube section 30 is suitably secured by a coupling 30a or the like, into the lower open end of passage 32a of the fitting 32 for free, uninterrupted flow of coolant from the fitting into the flexible pipe section 30.

An elbow fitting 33 is secured in the upper side wall of base 10 on the right hand side thereof in position generally below saddle mounted fitting 32. This elbow has the lower, vertically disposed leg 33a thereof extended downwardly to and discharging into reservoir R. The horizontally disposed leg 33b of elbow 33 pivotally mounts thereon a barrel or hollow head 34 which provides a radially disposed boss 34a having a tapped bore therethrough opening into the barrel or head 34 for discharge of coolant liquid therethrough into the head for flow from the head through leg 33b of elbow 33. The leg 33b is in open communication with the liquid flow space provided within the head 34 and thus receives liquid therefrom. The fitting 33 is mounted with the horizontally disposed leg 33b thereof extended outwardly and with its longitudinal axis about which head 34 rotates, parallel with the path of straight line movement of table T.

The pipe or tube section 31 is constituted by a rigid, stiff length of pipe and has one end thereof threaded or otherwise secured into the bore of boss 33b of the pivotally mounted head 34. This rigid pipe section 31 extends upwardly and forwardly from head 34, and is coupled to its upper-forward end with a liquid passing pivotal or swivel coupling 35 for receiving liquid from such coupling. The flexible tube section 30 extends forwardly and downwardly from the fitting 32 on saddle S and is coupled at its forward-lower end to the swivel coupling 35 for discharging liquid thereinto.

This swivel coupling 35 includes a hollow head or barrel 35a having a closed outer end, and a generally similar hollow head or barrel 35b having a closed outer end, with these heads 35a and 35b being mounted in the usual or any suitable manner with their axes aligned for rotative relation to each other about such aligned axes. The inner ends of the heads 35a and 35b are suitably rotatably engaged and formed to open into each other, so as to provide a closed liquid flow chamber or passage within the heads. Thus, this closed chamber formed within the heads permits flow of liquid therethrough and between the heads in all positions of relative adjustment thereof. The upper end of pipe section 31 is connected in liquid receiving communication with the head 35a, while the lower end of the pipe section 30 is connected in liquid discharging relationship to the other head 35b of swivel coupling 35. The liquid passing swivel coupling 35 in mounted position pivotally connecting pipe sections 30 and 31 has the axes of rotation of the heads 35a and 35b thereof parallel with the path of straight line feeding movements of table T and with the axis about which rotates the head 34 of the pivotal, liquid passing coupling 33. Pipe section 30 is generally radially disposed relative to the head 35b and pipe section 31 is generally radially disposed relative to the head 35a, of the swivel coupling 35. The arrangement of pipe sections 30 and 31 and the liquid passing swivel coupling 35, is such that coolant liquid will flow downwardly through pipe section 30 from saddle passage 25, through the heads 35a and 35b of coupling 35, and into pipe section 31 for return flow downwardly into and through the fitting 33 from which the coolant is discharged into the reservoir R.

The arrangement of the rigid, upwardly and forwardly disposed, pivotally mounted pipe section 31 and the downwardly and forwardly extended pipe section or tube 30, angularly disposed relative to each other, with the adjacent forward ends thereof swivelly coupled in liquid passing communication, thus provides a collapsible and extendable return flow line from the saddle S to the reservoir R, of an exceedingly compact character. By the arrangement there results a minimum of structure of the flow line which need project outwardly beyond the base 10 and/or the knee, saddle and table assembly, due to the fact that the flexible section 30 may be provided of a length necessary to provide the over-all extended length of the flow line required in maximum extended position, so that, the forwardly extending rigid pipe section 31 may be of minimum length. With such minimum length requirement for the rigid section 31, it is possible to control and determine the maximum extent of forward projection thereof when the line is in maximum collapsible position. And in collapsed positions the flexible section due to its opposite end mountings on the forward end of the rigid section and on the rigid elbow 32a of saddle S, will bend or flex inwardly into a bight as the line is collapsed by movement of the sections toward each other, to thus provide slack to compensate for the reduction in distance between saddle mounted elbow 32a and base mounted elbow 33, while constraining and confining the location of such bight within the arrangement of the projected plan of the base 10.

In accordance with my invention as exemplified by the adaptation thereof for the return flow of coolant from the work table of a machine tool knee, saddle and work table assembly, to a reservoir in the frame structure of the machine of the illustrated example, there is provided a coolant return flow line which discharges from a drainage discharge point at one end of the work table adjacent the rear side thereof to a closed passage in and through the saddle along and adjacent the rear side thereof and from the saddle passage to the reservoir by a flow return line which consists of swivelly mounted pipe or tube sections permitting vertical feeding movements of the assembly and independent cross feeding movements of the saddle, or compound movements of knee and saddle. The work table T is designed and formed with a system of drainage channels and wells arranged for continuous gravity drainage of coolant to the table discharge point. The arrangement of the table carried discharge tube longitudinally movably located and positioned in the saddle flow passage provides a structurally simple, leak-proof arrangement for delivering the coolant from the table to the saddle passage while permitting and without interference with normal longitudinal feeding movements in either direction of the table T on and relative to the saddle. By the arrangement of saddle flow passage 25 and the table carried discharge tube 26 movably disposed therein in telescopic relation with the saddle passage, any necessity for breaking or providing area destroying openings through the system of table bearing surfaces of saddle S, is eliminated, so that that portion 8 of the table bearing surfaces of the saddle over the passage 25 is unbroken and presents a continuous maximum area bearing surface.

The arrangement of the return flow system by which the return flow line from the table to the saddle is located at one end of the table and the adjacent side of the saddle, and is positioned within the projected area of the plan of the table at all times, eliminates any projection of structure beyond the plan dimensions of the table, while the discharge of coolant from the saddle at the opposite side thereof from which coolant is received in the saddle from the table, maintains at a minimum the projection of any structure or elements of the return flow system into positions constituting serious obstruction in the clearance space around the machine or around the knee, saddle and table assembly.

While I have shown an embodiment of the invention designed and adapted for the particular knee, saddle and table assembly of the selected example, it is to be understood that implementation of my system to other types and designs of knee, saddle and table assemblies, as well as to other arrangements of coolant receiving work tables or their equivalent mounted on a support structure for movement relative thereto, are contemplated and included within the scope of my invention. Attention is also directed to the fact that that portion or sub-combination of a system of my invention which provides the table mounted discharge tube longitudinally movably or telescopically received in a passage formed in the table support member, is not necessarily limited or restricted to use with the remainder of the flow system of the invention provided by the swivelly associated pipe sections 30 and 31, but is of utility in returning coolant or other functional liquid from a work table or the like member, into a passage in a supporting member for this table irrespective of the disposition and handling of the liquid discharge from the passage in the table support member. And similarly, the return flow line of my invention comprised of the swivelly connected sections 30 and 31 is not limited or restricted to use as a subcombination of the system of my invention which includes the discharge tube 26 telescopically received in the saddle passage 25, as such return flow line provides an entity of general utility for flow of liquid or fluid between two relatively movable structures. It is also to be here noted that the return flow line itself is not limited to use with a knee saddle and table assembly, or a knee and saddle assembly, as it may be employed with an assembly in which the support structure has only movements toward and from the base structure, or only movements across the base structure.

It will also be evident that various other embodiments, mechanical expressions, constructions, combinations and subcombinations may be resorted to without departing from the broad sphere and scope of my invention and hence, I do not wish or intend to limit and restrict my invention in all respects to the specific disclosures hereof as illustrated and described herein by way of example, except as may be required by specific intended limitation thereto in any of the appended claims.

What I claim is:

1. In combination, a support structure, a work table movably mounted on said support structure for feeding movements in either direction thereon along a straight line path, said support structure being provided with a liquid flow passage therein in general parallel relationship with the path of feeding movements of said work table, a liquid discharge tube mounted on and carried by said table with its longitudinal axis parallel with the path of feeding movements of the table, and said discharge tube being extended into and being freely longitudinally movable in and through said liquid flow passage in said support structure for discharge of liquid therefrom into said passage in all positions of said tube in the passage.

2. In combination, a support structure, a work table mounted thereon for horizontal movements in either direction along a straight line path, said support structure being formed with a liquid flow passage therethrough generally parallel with the straight line path of movements of said work table, a liquid discharge tube mounted on and carried by said work table in position with its longitudinal axis parallel with the straight line path of movements of said work table and aligned with said saddle passage, and said discharge tube being extended a distance into and being freely longitudinally movable in and through said support structure passage for discharge of liquid thereinto in all positions thereof in said passage.

3. In combination, a supporting structure, a work table mounted in horizontally disposed position on said supporting structure for movement in either direction along a straight line path, said supporting structure being formed with a liquid flow passage therethrough disposed substantially parallel with the path of movements of said work table, a liquid discharge tube mounted at one end thereof on said work table in position disposed therebelow with its axis substantially parallel with the path of movements of said table and in alignment with the passage in said supporting structure, said table mounted liquid discharge tube being extended inwardly a distance into said supporting structure passage for longitudinal movements therein and therethrough and being formed for discharge of liquid therefrom into said passage, and means connected to said passage at the end thereof opposite said discharge tube for discharge of liquid thereinto from said passage.

4. In combination, a vertically movable knee, a saddle mounted on said knee for cross feeding movements in either direction along a straight line path, a work table mounted on said saddle for longitudinal feeding movements in either direction along a straight line path perpendicular to the path of cross feeding of said saddle, said table being formed with a liquid discharge opening at one end thereof, a liquid discharge tube mounted at one end thereof on and carried by said table in liquid receiving communication with said table liquid discharge opening and being open at its opposite end for discharge of liquid therefrom, said tube being mounted in position with its longitudinal axis parallel with the straight line path of movements of said table, said saddle being formed with a liquid flow passage therethrough disposed in position aligned with said liquid discharge tube, and said discharge tube being extended a distance into and being longitudinally movable in and through said saddle passage for discharge of liquid therefrom into said passage in all positions of the tube in the passage.

5. In a machine tool, in combination, a frame structure including a liquid reservoir therein, a vertically movable knee, a saddle mounted on said knee for cross feeding movements in either direction along a straight line path, a work table mounted on and carried by said saddle for longitudinal feeding movements thereof in either direction along a straight line path perpendicular to the path of cross feed of said saddle, said table being provided at one end thereof with a liquid discharge outlet, said saddle being formed with a liquid flow passage therethrough substantially parallel with the path of longitudinal feeding movements of said work table, a liquid discharge tube mounted at one end thereof on and carried by said table in liquid receiving communication with said table discharge outlet and being formed for discharge of liquid therefrom, said tube being mounted in position with its longitudinal axis aligned with said saddle passage and being extended a distance into and being movable in either direction through and relative to said passage and saddle, and a discharge line connected between and in liquid receiving communication with the end of said saddle passage opposite said table carried discharge tube and said reservoir in liquid discharging communication with the latter, said discharge line being comprised of swivelly mounted tube sections relatively movable for independent and/or compound vertical and cross feeding movements of said knee and saddle, respectively.

6. In combination, a vertically movable knee, a saddle mounted on said knee for movements in either direction along a straight line path, a work table mounted on said saddle for movements thereon independently thereof in either direction along a straight line path perpendicular to the path of the movements of said saddle, said table being provided at one end thereof with a liquid discharge outlet, said saddle being formed with a closed liquid flow passage therethrough open at its opposite ends through opposite sides, respectively, of the saddle, a liquid flow line connecting said table discharge with one end of said saddle passage and being constructed and arranged for feeding movements of said saddle on and relative to said table, and a liquid discharge line connected and in liquid receiving communication with the opposite end of said saddle passage.

7. In combination, a knee, a saddle and a work table mounted for relative movements therebetween, said saddle being formed with a liquid flow passage therethrough opening at its opposite ends through the opposite sides, respectively, of said saddle, said table being formed with a liquid discharge outlet therein, a liquid flow line from said table outlet to one end of said saddle passage for discharging liquid from said table to said passage, and a liquid flow line in communication with the opposite end of said saddle passage for receiving liquid therefrom.

8. In combination, a frame structure including a reservoir therein, a knee, saddle and work table mounted for relative movements therebetween, said work table including a liquid discharge outlet therefrom, said saddle being formed to provide a closed liquid passage therethrough open at its opposite ends in opposite side walls, respectively, of said saddle, a liquid flow line connecting said table discharge opening with said saddle flow passage at one end thereof, said flow line being constructed and arranged for relative movements between said saddle and work table, a liquid discharge line from the opposite end of said saddle passage to said reservoir for discharge flow of liquid therethrough from said saddle passage to the reservoir, and said discharge flow line being constructed and arranged for movements of said saddle and knee relative to each other and to said reservoir.

9. In a machine tool, in combination, a frame structure including a liquid reservoir therein, a vertically movable knee, a saddle mounted on said knee for movements in either direction along a straight line path, a work table mounted on said knee for movements in either direction along a straight line path perpendicular to the path of movements of said saddle, said table being provided at one end thereof with a liquid discharge outlet, said saddle being formed with a liquid flow passage therethrough substantially parallel with the path of movements of said work table, a liquid discharge tube mounted at one end thereof on and carried by said table in liquid receiving communication with said table discharge outlet and being open at its opposite end for discharge of liquid therefrom, said tube being mounted in position extending into said saddle passage through one end thereof for movement longitudinally in either direction in and through said passage, and a discharge line connected between and in liquid receiving communication with the end of said saddle passage opposite said discharge tube receiving end and said reservoir in liquid discharge communication with the latter.

10. In combination, a vertically movable knee, a saddle mounted on said knee for cross feeding movements in either direction along a straight line path, a work table mounted on said saddle for longitudinal feeding in either direction along a straight line path perpendicular to the path of cross feeding of said saddle, said table being formed with a system of liquid drainage passages therein having a discharge at one end of the table, a liquid discharge tube mounted on and carried by said table in liquid receiving communciation with said table discharge at one end and being open at its opposite end for discharge of liquid therefrom, said tube being mounted in position with its longitudinal axis parallel with the straight line path of longitudinal feed of said table, said saddle being formed with a liquid flow passage therethrough substantially parallel with the path of feed of said table, and said table carried discharge tube being extended into and being longitudinally movable in and through said saddle passage for discharge of liquid therefrom into the passage in all positions of the tube in the passage.

11. In a machine tool, in combination, a frame structure including a liquid reservoir therein, a vertically movable knee, a saddle mounted on said knee for cross feeding movements horizontally in either direction along a straight line path, a work table mounted on and carried by said saddle for longitudinal feeding movements thereon horizontally in either direction along a straight line path perpendicular to the path of feed of said saddle, said table being formed with a liquid discharge outlet, said saddle being formed with a liquid flow passage therethrough disposed approximately parallel with the path of feeding movements of said table, a liquid discharge tube mounted at one end thereof on said table in liquid receiving communication with said table outlet, said tube being mounted in position with its longitudinal axis substantially parallel with the path of movement of said table and being extended through one end of and a distance into said saddle passage and being movable longitudinally in either direction through said passage, and a liquid discharge line connected in liquid receiving communication with the end of said saddle passage opposite the end thereof through which said table carried tube extends and being extended to and in liquid discharge communication with said reservoir.

12. In combination, a support structure providing on the upper side thereof a system of slide surfaces, a work table mounted on said slide surfaces for feeding movements thereon in either direction along a straight line path, said supporting structure being formed with a closed side liquid flow passage therethrough beneath said system of slide surfaces disposed substantially parallel with the path of feeding movements and being open at its opposite ends, a liquid discharge member mounted on and movable with said table for discharge of liquid from the table into said supporting structure passage, and said table carried discharge member being disposed with its longitudinal axis substantially parallel with the path of movements of said table and being extended into said passage through one end thereof for movements longitudinally therein by feeding movements of said work table.

13. In combination, a saddle structure comprising a solid body formed to provide a continuous slide surface across the outer face thereof, a work table slidably mounted on said slide surface and being constrained on said saddle body to movements in either direction thereacross along a straight line path, said table having a length greater than the width of said body and being extended beyond opposite sides of the saddle, said saddle body being formed to provide a closed side liquid discharge passage therethrough beneath and opening at its opposite ends through the opposite sides of the saddle body, said work table having a liquid drainage opening at the inner side adjacent one end thereof, and a liquid discharge tube mounted on said table in position therebeneath with one end thereof connected in liquid receiving communication with said table drainage opening and the opposite end thereof extended into said saddle flow passage through the adjacent open end of the passage, said discharge tube being disposed substantially parallel with the path of movement of said table and being movable by the table longitudinally in either direction in said passage.

THEODORE F. ESERKALN.

REFERENCES CITED

The following references are of record in the file of this patent:

UNITED STATES PATENTS

| Number | Name | Date |
|--------|------|------|
| 995,256 | Kearney et al. | June 13, 1911 |
| 1,938,777 | Nenninger | Dec. 12, 1933 |